May 20, 1969 D. R. LOHRMANN 3,445,798

SHORT-TIME MELTING FUSE

Filed Aug. 4, 1967

INVENTOR,
DIETER R. LOHRMANN.

BY: Roy E. Gordon AGENT.
Harry M. Saragovitz,
Edward J. Kelly &
Herbert Berl ATTORNEYS.

United States Patent Office
3,445,798
Patented May 20, 1969

3,445,798
SHORT-TIME MELTING FUSE

Dieter R. Lohrmann, 348 Grant Ave., Eatontown, N.J. 07724

Filed Aug. 4, 1967, Ser. No. 658,990
Int. Cl. H01h 85/14
U.S. Cl. 337—227 1 Claim

ABSTRACT OF THE DISCLOSURE

A short-time melting fuse is provided comprised of a base material having a top and bottom surface, the top surface of which is coated respectively with superimposed first and second thin layers. The distal ends of the second thin layer are terminated by electrical contacts. The base material is a good heat conductor. The first thin layer material is characterized by both thermal and electrically insulating properties, and the second thin layer material is an electrical conductor. In addition, the second thin layer material is shaped in the form of two end sections interconnected by a narrowed strip.

Figure 1:
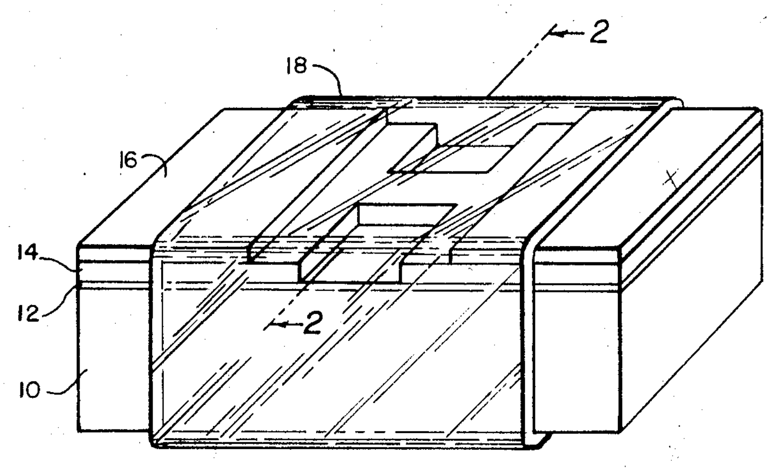

The invention described herein may be manufacured, used, and licensed by or for the Government for governmental purposes without the payment to me of any royalty thereon.

*Background of the invention*

Heretofore, it has been possible to protect transistorized equipment and other semiconductor (solid state) circuits in cases of overload as, for example, short circuit by conventional type fuses. That is, the transistor or other solid state devices would burn out before the fuse was activated. This happens because ordinary fuses have too large a time constant to react to a temperature transient.

In practice, this problem has been met by using "electronic fuses," that is, some type of complex and expensive electronic switch-off circuitry. However, there are cases where one would not like to spend this additional expense and still have protection.

The general object of this invention is to provide an inexpensive short-time fuse. A more specific object of this invention is to provide a fuse that will protect transistorized equipment and other solid state circuits in cases of overload.

*Summary of the invention*

The short-time melting fuse provided by this invention includes a base material having a top and bottom surface with first and second thin layer materials respectively superimposed on the top surface of the base material. The distal ends of the second thin layer are terminated by electrical contacts. In addition, the second thin layer material is shaped in the form of two end sections interconnected by a narrowed strip.

The base material is a good heat conductor and an electrical insulator such as beryllium oxide.

The first thin layer is comprised of a heat and electrically insulating material as, for example, a thin film of silicon oxide or silicon dioxide or a thin lacquer or epoxy film.

The second thin layer is comprised of an electrically conducting material as, for example, a thin film of lead, copper, tin or silver, or even a thin layer of a semiconductor material.

The electrical contacts can be comprised of any suitable electrically conducting material as copper, silver or, in fact, the same material as was used for the electrically conducting layer.

There may also be provided a cover extending over the fuse but leaving the electrical contacts open or free. The cover is comprised of a material such as epoxy, plastic, rubber, lacquer, etc. or any other suitable material that will protect the fuse against mechanical and corrosive damage.

*Brief description of the drawing and preferred embodiment*

Figure 2:
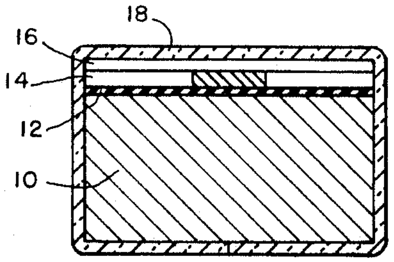

The invention can be best illustrated by reference to the drawing wherein:

FIG. 1 is an isometric view of the short-time melting fuse of the invention; and FIG. 2 is a cross-section view taken along the line 2—2 of FIG. 1.

Referring to FIG. 1 and FIG. 2, there is shown at 10 a suitable base material as, for example, a slab of beryllium oxide. Upon the base material 10 there is deposited by conventional deposition techniques as, for example, vacuum deposition, a thin layer of an electrically and thermally insulating material 12 as, for example, a thin film of silicon oxide. On top of the electrically insulating material 12 there is deposited by conventional deposition techniques as, for example, vacuum deposition, a thin layer or film of an electrically conducting material 14 as, for example, a thin film of lead. The electrically conducting material 14 is comprised of two end sections with a narrowed strip of the electrically conducting material interconnecting the two end sections thus giving an H shape configuration as particularly shown in FIG. 1. This narrowed strip or cut-in spot is adapted for melting away at overload. Copper deposits 16 deposited as, for example, by vapor depositions on the distal ends of the electrically conducting material 14, make the electrical connection to the outside load (not shown). A cover 18 can be included that extends over the fuse to protect it against mechanical and corrosive damage. The electrical contacts are left open or free, of course, to make connection to the external load.

The base material 10 has a thickness on the order of 1 to 5 millimeters. The electrically insulating layer 12 deposited on the base material has a thickness of about 0.03 to 0.04 millimeter. The electrically conducting layer 14 deposited on the electrically insulating layer has a thickness of about 0.07 to 0.09 millimeter.

The fuse of this invention operates in the following manner. When the current is switched on, the steady state temperature of the electrically conducting film 14 is reached in a very short time. The reason for this is that the heat capacity of the electrically conducting film 14, particularly that of the narrowed section of the film and the heat capacity of the electrically insulating material 12, is very low. Furthermore, equilibrium of heat conduction through the electrically insulating material 12 to the base material 10 is reached very quickly as the electrically insulating material 12 is very thin and the base material 10 serves as a heat stick. When the fuse is subjected to a sudden surge of current, the accompanying heat destroys the heat equilibrium causing the narrowed strip of the electrically conducting film 14 to melt away in a very short time. Thus, the fuse has reaction times shorter than those attained by previous conventional type melting fuses.

The foregoing description is to be considered merely as illustrative of the invention and not in limitation thereof.

What is claimed is:

1. A short-time melting fuse comprising a base material having a top and bottom surface with first and second thin layer materials respectively superimposed on the top surface of the base material, said base material being a good heat conductor and an electrical insulator, the first thin layer material being characterized by both thermal and electrically insulating properties, the second thin layer material being an electrical conductor, said second thin layer material being shaped in the form of two end sections interconnected by a narrowed strip, the distal ends of said second thin layer being terminad by electrical contacts.

References Cited

UNITED STATES PATENTS

| | | | |
|---|---|---|---|
| 2,934,627 | 4/1960 | Bristol et al. | 200—135 |
| 2,941,059 | 6/1960 | Sims et al. | 200—135 |
| 3,187,226 | 6/1965 | Kates | 29—626 |
| 3,194,925 | 7/1965 | Cox | 337—222 |
| 3,354,542 | 11/1967 | Mallia | 29—625 |
| 2,326,257 | 8/1943 | Schmidt et al. | 337—166 |

BERNARD A. GILHEANY, *Primary Examiner.*

HIRAM B. GIBSON, *Assistant Examiner.*

U.S. Cl. X.R.

317—114; 337—166, 222